United States Patent [19]

Stipdonk

[11] Patent Number: 4,489,828

[45] Date of Patent: Dec. 25, 1984

[54] DEVICE FOR SPLICING CABLE ENDS

[75] Inventor: Gustaaf Stipdonk, Hilliard, Canada

[73] Assignees: Petro-Canada Exploration Inc., Calgary; Her Majesty the Queen in right of the Providence of Alberta, Alberta Oil Sands Equity, Edmonton; PanCanadian Petroleum Limited, Calgary; Esso Resources Canada Limited, Calgary; Canada-Cities Service, Ltd., Calgary; Gulf Canada Limited, Toronto; Alberta Energy Company, Ltd., Calgary; Hudson's Bay Oil and Gas Company Limited, Calgary; Petrofina Canada Inc., Calgary, all of Canada

[21] Appl. No.: 365,583

[22] Filed: Apr. 5, 1982

[51] Int. Cl.³ .............................................. B65G 15/34
[52] U.S. Cl. ................................... 198/847; 24/31 W
[58] Field of Search ............... 198/847, 844; 24/31 W, 24/38, 39; 403/275, 296, 287, 299, 343

[56] References Cited

U.S. PATENT DOCUMENTS

| | | | |
|---|---|---|---|
| 196,235 | 10/1877 | Knapp | 403/275 |
| 1,941,113 | 12/1933 | Schwarz | 403/275 |
| 2,239,026 | 4/1941 | Wagner | 403/275 |
| 2,659,062 | 11/1953 | Tibbets | 403/275 |
| 3,945,263 | 3/1976 | Simonsen et al. | 198/847 |

FOREIGN PATENT DOCUMENTS 346846 6/1960 Switzerland ...................... 403/275

Primary Examiner—Joseph E. Valenza
Assistant Examiner—Kyle E. Shane
Attorney, Agent, or Firm—Ernest Peter Johnson

[57] ABSTRACT

A steel connector for joining the steel cable ends of a conveyor belt is provided. The connector comprises a pair of tubular sleeves—one of which is slipped onto each cable end. Each sleeve has a bore having an inner section of reduced diameter relative to the outer section. The cable end is expanded radially, by driving a cone into its end, and then the expanded end is wedged tightly into the inner section of the sleeve to fix them together. Bridging members are threaded into the outer sections of the two sleeves to hold them together in lineal alignment. The bridging members are operative to permit the sleeves to flex relative to each other.

4 Claims, 5 Drawing Figures

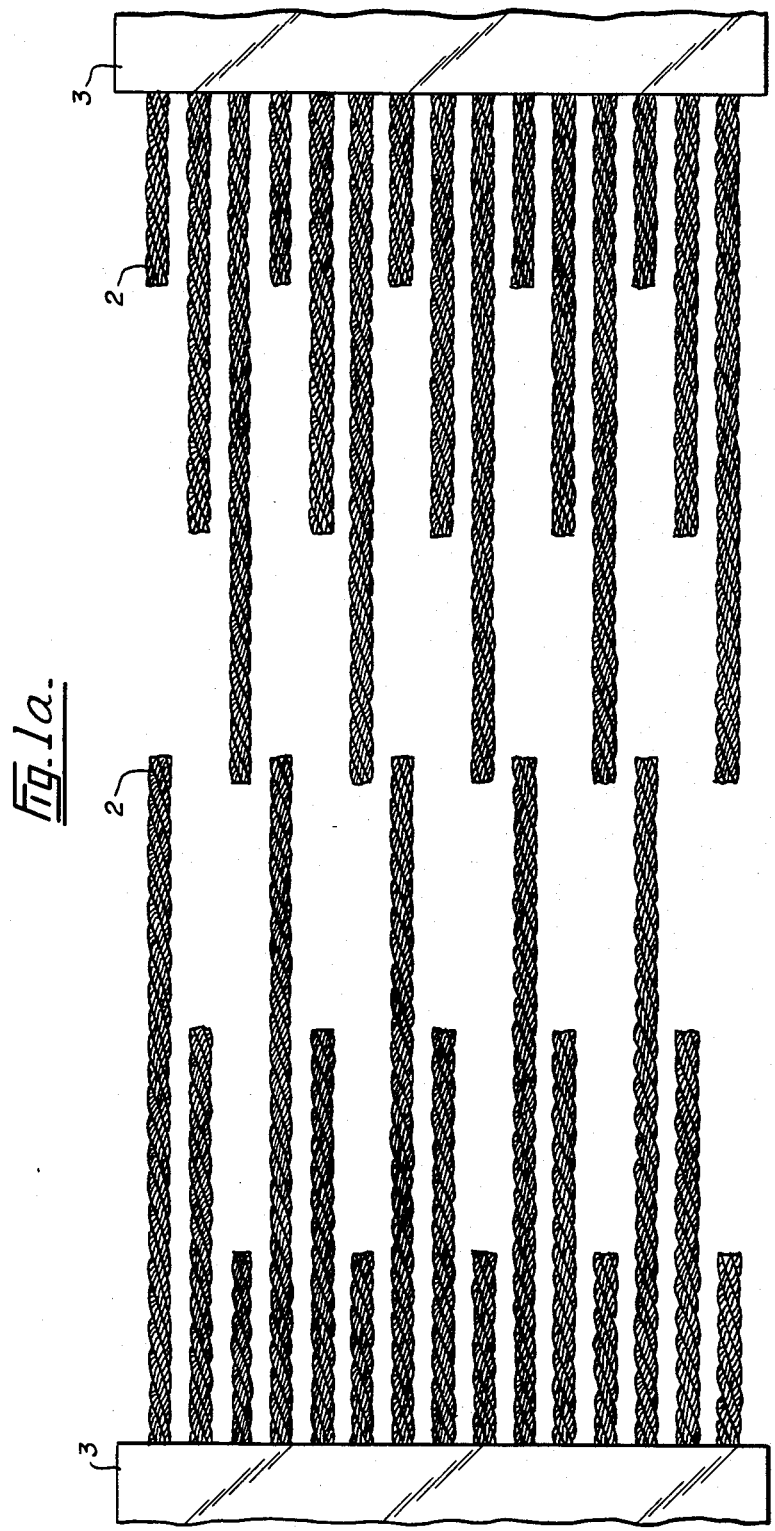

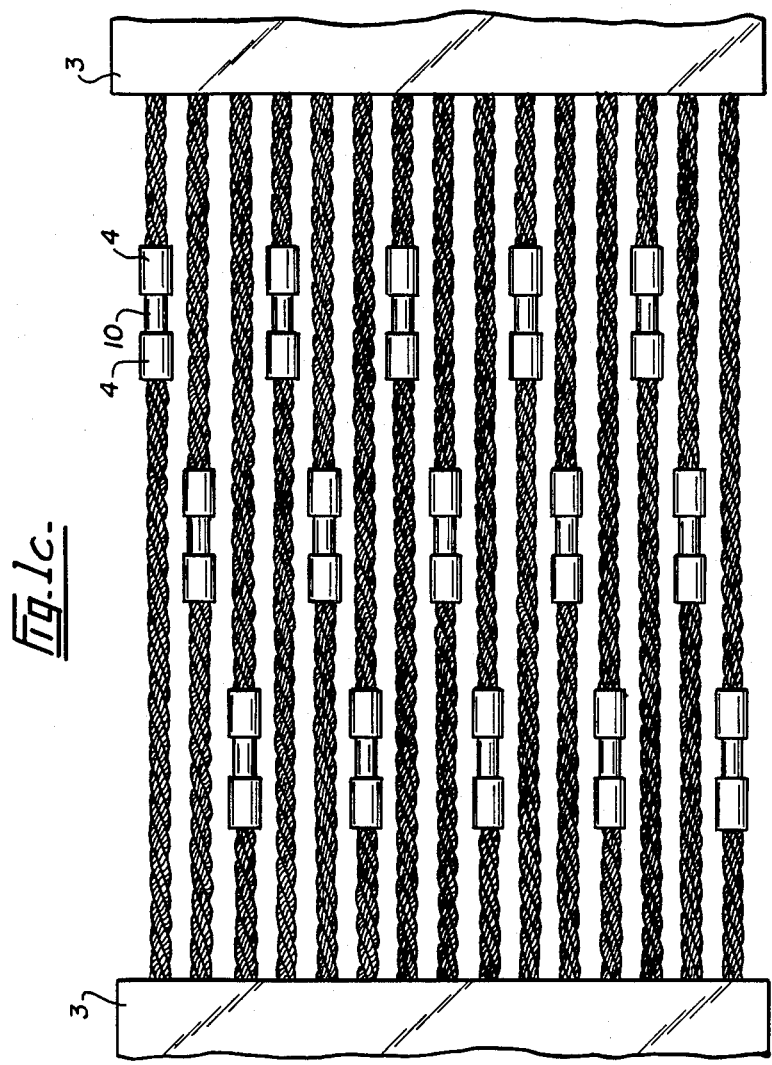

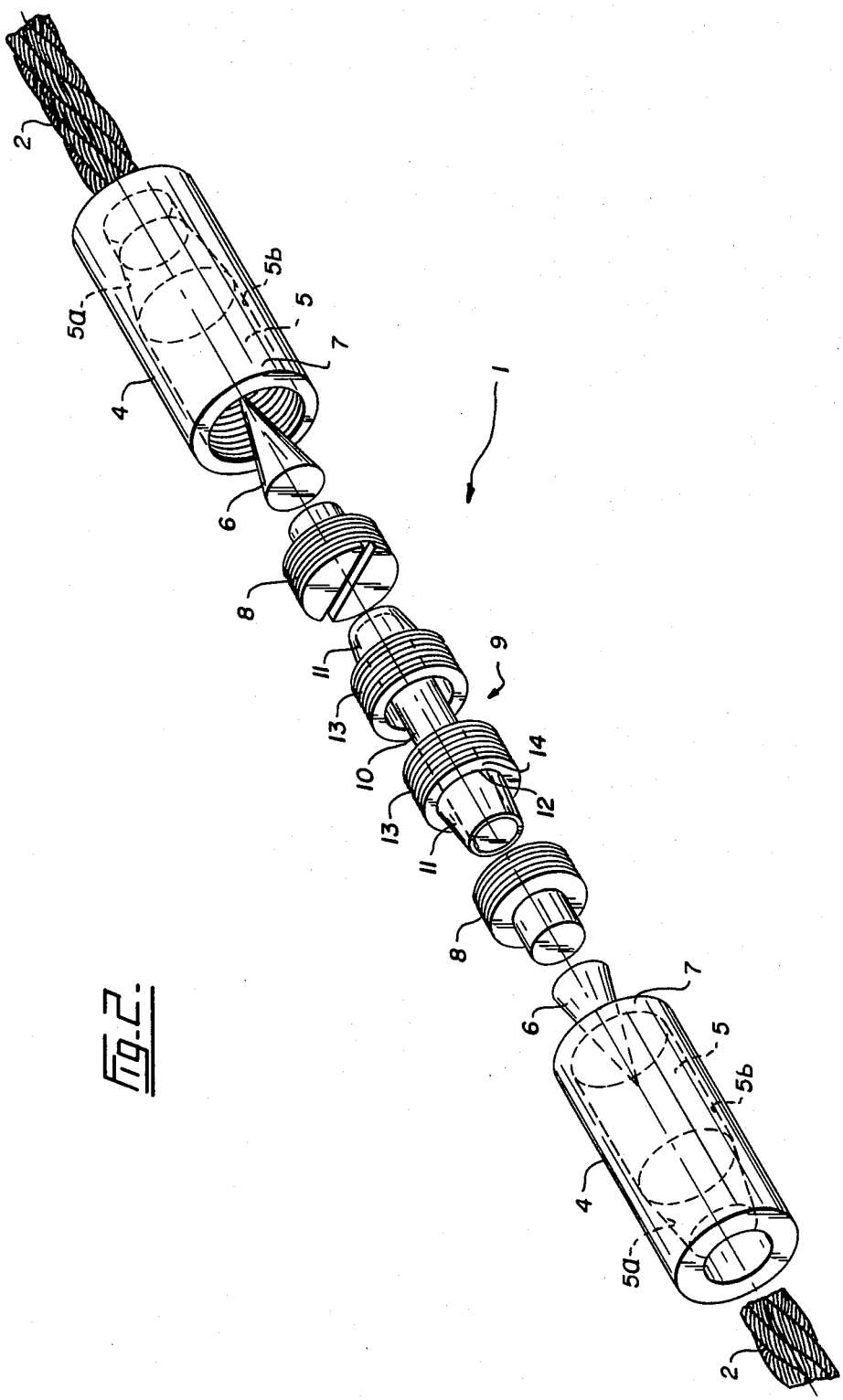

DEVICE FOR SPLICING CABLE ENDS

FIELD OF THE INVENTION

This invention relates to a connector for joining two steel cable ends. The connector finds particular application for splicing cable ends in a conveyor belt.

BACKGROUND OF THE INVENTION

The invention has been developed in connection with the very large conveyor belts used in Alberta to transport tar sand from a mine to a bitumen recovery plant. Therefore the invention and the problems which it seeks to alleviate are described below with respect to this particular application; however, it is to be understood that the invention is not limited to said application.

The tar sand conveyor belts are large and operate in demanding conditions. They commonly have a width of 60 inches and may stretch in length over a distance of several hundred feet or several miles, depending on their role in the system. In use, a stream of tar sand is continuously dropped onto the endless belt at the loading point, to form a furrow about 55 inches in width and 12 inches in height. The stream usually includes large boulders and, in winter, chunks of frozen tar sand. Some of these pieces with hundreds or thousands of pounds and, in some cases, they are dropped onto the belt from a height of several feet. As a result, the belts frequently experience deep cuts and impact stress. In addition, the hydrocarbons present in the tar sand tend to permeate the material of the belt and cause deterioration.

In structure, each belt comprises a bottom layer of rubber, a series of steel cables laid lengthwise in parallel, closely spaced arrangement on top of the bottom layer, and a top layer of rubber laid over the cables. The three components are bonded together by a middle layer of vulcanized tie-gum rubber.

Each conveyor is formed of one or more supported lengths of belt. In the case of a conveyor made using only a single length of belt, the ends of the length are joined to form an endless belt running on idlers and around two end rolls. In the case of a longer conveyor, the ends of several lengths are joined in sequence in end to end relation to form the endless belt. Furthermore, when a belt fails, it is usual to cut out a short length at the failure point and splice in a substitute length of new material. So each belt includes one or more joins or splices along its length.

As previously mentioned, the belts are subjected to stress and chemical attack—thus they periodically fail. These failures commonly occur at the splices.

Heretofore the conventional practice for joining the belt ends involved the following: the top layer of rubber would be cut away at the splice zone to expose the cable ends. These ends would be scrupulously cleaned. An end portion of the bottom layer would be cut away. Then the bottom rubber layer ends would be brought into abutment and the cable ends laid in side-by-side overlapping relation. Tie-gum would then be applied to cover the splice zone, a section of top rubber would be laid on, and the whole would be vulcanized.

It will be perceived from the foregoing that the connection means between the steel cable ends in a joint of this kind is only the tie-gum rubber, supported by the top and bottom layers of rubber. As mentioned, this is where failure occurs.

The cost is high for repairing such a failure. The failure point is frequently high off the ground. The weather is often cold. Thus it is frequently necessary to first build a heated shelter high off the ground over the splice area. The splicing procedure itself is slow going and labor intensive. But most important, the belt is out of operation for 2 or 3 days. In the case of a 125,000 BOPD synthetic crude plant, the shutdown of a belt can reduce the volume of feed to the plant by 25%, which translates into a loss of many thousands of dollars per day.

One solution to this problem would be to develop a mechanical connector to join the cable ends. Such a connector preferably should have the following characteristics:

(1) a high order of strength;
(2) compactness, as the closely spaced cables each will include such a connector at the splice and they must all fit without problem within a limited area;
(3) a limited degree of flexibility, to enable the connector to negotiate the passage over the end rolls without serious problems; and
(4) lengthwise adjustability to permit the cables to be pre-tensioned to about the same extent.

SUMMARY OF THE INVENTION

In accordance with the invention, a steel mechanical connector is provided, to join two steel cable ends.

The connector comprises a pair of tubular sleeves, one for each cable end. Each sleeve forms a longitudinal bore therethrough consisting of two sections—an outer bore section and an inner bore section of reduced cross-sectional area relative to the outer section. The sleeve bore is of sufficient cross-sectional area so that the sleeve may easily slip over the cable end.

With the sleeve in place on a cable end, a wedge member, such as a metal cone, is embedded in the cable end to enlarge it. The enlarged end is of a size sufficient to pass through the outer bore section but not through the inner bore section. The cable end is then pulled tightly into the inner bore section to wedge it therein and provide a friction interlock between cable and sleeve.

At this stage, each of the sleeves is affixed to a cable end and extends beyond the latter.

A bridging component is then interconnected with each sleeve so as to hold them together in aligned lineal relation while preferably permitting of limited universal movement of one sleeve relative to the other. One specific bridging component with these capabilities is described below.

Broadly stated, the invention comprises a connector for joining two cable ends in a conveyor belt, comprising: a pair of sleeves, each such sleeve forming a longitudinal bore extending therethrough, said bore having an inner section of reduced cross-sectional area relative to the remainder of the bore, said bore being of sufficient cross-sectional area so that each sleeve can slip onto one of the cable ends to be joined; a pair of wedge elements, each adapted to be embedded in one cable end, once the sleeve has been slipped onto the cable end, to expand said cable end sufficiently so that the expanded end is small enough to enter the bore's outer section but is too large to pass through the bore's inner section, whereby each sleeve may be securely attached to one cable end; and bringing means for interconnecting the sleeves, said bridging means comprising rigid elongated first means extending between the sleeves, second means for connecting one end of the first means with one sleeve and enabling said first means to pivot relative to the longitudinal axis of said sleeve, and third means for connecting the other end of the first means with the other sleeve and enabling said first means to pivot relative to the longitudinal axis of said sleeve, whereby the bridging means is operative to hold the sleeves together in substantially aligned lineal relation while permitting the connector to flex, to a limited extent, when passing around a conveyor roll.

In another aspect, the invention encompasses a method for connecting two ends of steel cable. The method comprises slipping a tubular sleeve over each cable end, said sleeve having a bore which has an inner section of reduced cross-sectional area relative to its outer section; expanding the cross-sectional area of each such cable end; drawing each sleeve outwardly on its associated cable end, to tightly wedge the expanded cable end into the inner section of the sleeve; and joining the sleeves with bridging means for holding the sleeves together in substantially linear alignment.

The invention is exemplified by the preferred embodiment set forth in the drawings and described below.

DESCRIPTION OF THE DRAWINGS

FIGS. 1a, 1b and 1c are top plan views showing the two ends of a conveyor belt with the top rubber layer removed and the bottom rubber layer not shown—the pairs of cable ends to be spliced are shown: in staggered spaced-apart arrangement in FIG. 1a, with the sleeves in place in FIG. 1b, and with the bridging means in place in FIG. 1c;

FIG. 2 is a perspective exploded view showing the connector; and

DESCRIPTION OF THE PREFERRED EMBODIMENT

Figure 1B:
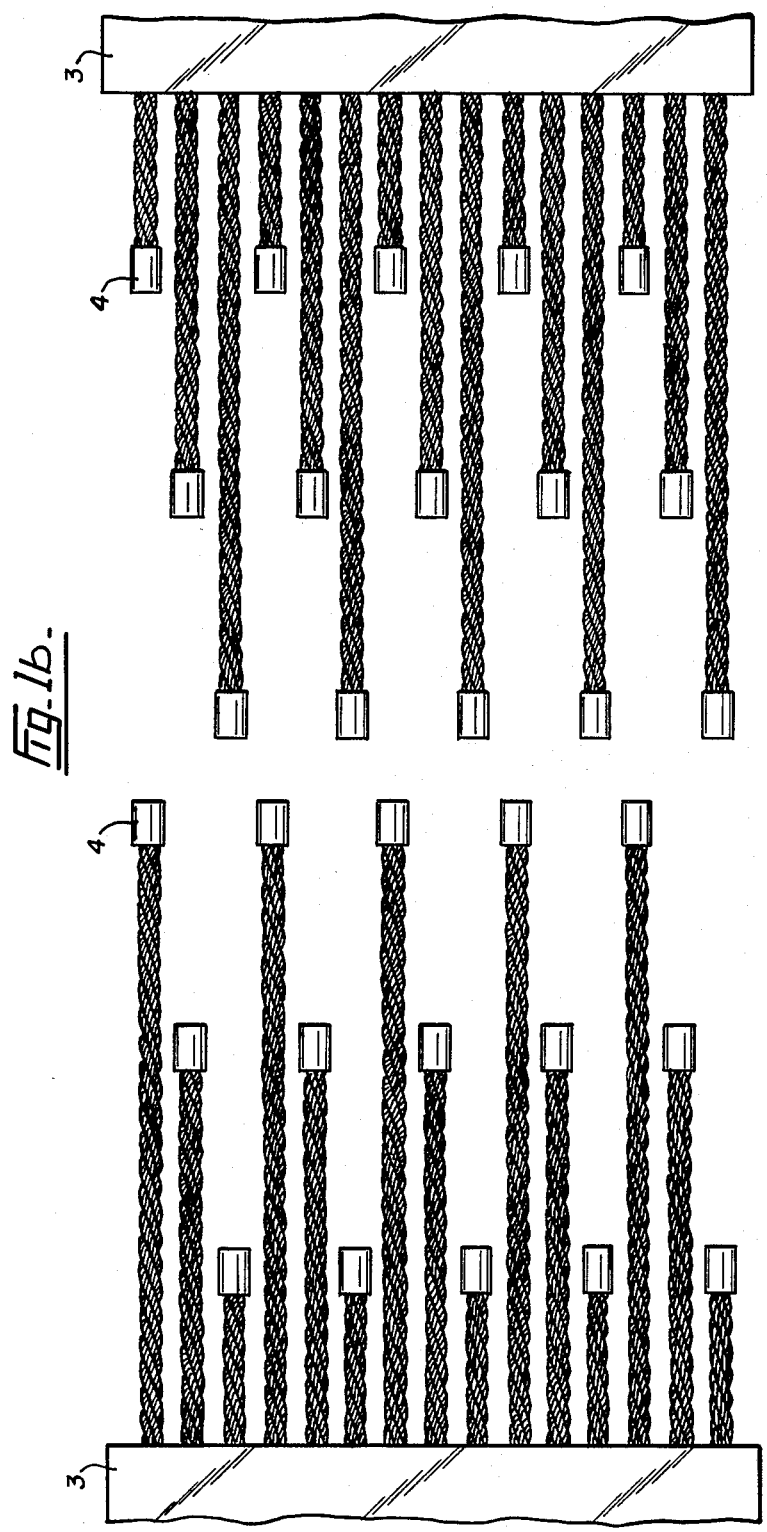
Figure 3:
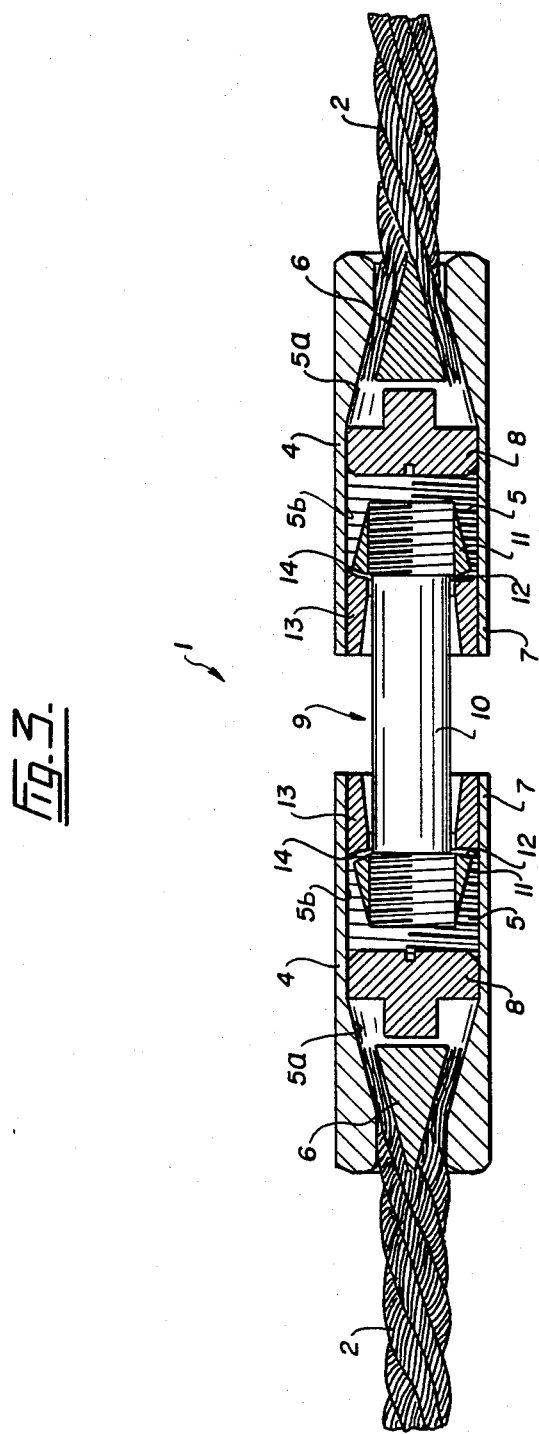
FIG. 3 is a side sectional view showing a connector joining two cable ends.

A connector 1 is shown in the Figures connecting a pair of cable ends 2, which form part of a conveyor belt 3.

The connector 1 comprises a pair of tubular sleeves 4, each sleeve 4 being associated with one of the cable ends 2. Each such sleeve 4 has a longitudinal bore 5 extending therethrough. The bore 5 consists of an inner section 5a and an outer section 5b. The inner section 5a is of reduced cross-sectional area relative to the outer section 5b. More particular, the inner section 5a is tapered in configuration, while the non-reduced outer section 5b is cylindrical. The diameter of the inner section 5a is of sufficient size so that the sleeve 4 slips easily onto the cable end 2.

A wedge member, specifically a cone 6, is embedded in each cable end 2 to expand it, so that said expanded cable end is too large to pass through the tapered inner section 5a of the bore 5 but is still capable of passing through the non-reduced outer section 5b.

The cable end 2 is drawn into its associated sleeve 4 to wedge the expanded cable end 2 tightly into the tapered inner section 5a of the bore 5. Each sleeve 4 is thus fixed on its cable end 2.

The outer end 7 of each sleeve 4 is internally threaded. An externally threaded lock screw 8 is screwed deep into the outer section 5b of the bore 5 to abut the cone 6 and prevent it being extruded from the cable end 2.

A sleeve interconnecting or bridging assembly 9 is provided to join the two sleeves 4. The assembly 9 includes a shaft 10 threaded at its ends. Rings 11 are threaded onto the shaft ends to provide enlarged heads. The rear shoulder 12 of each shaft ring 11 is arcuately formed, as shown. The shaft 10 extends into each of the outer sections 5b of the sleeve bores 5. An externally threaded sleeve lock ring 13 is screwed into each bore outer section 5b to trap the relevant shaft head 11. The inner shoulder 14 of each sleeve lock ring 13 is arcuately shaped, so as to mate with the shoulder 12 of the head 11. Since the outside diameter of the shaft 10 is slightly less than the internal diameter of the sleeve lock ring 13, the sleeves 4 may move universally relative to each other. The degree of movement is limited, but is sufficient to ensure that the connector 1 may flex when passing around the conveyor drums.

The invention is characterized by several advantages. Firstly, a steel bond between cable ends now replaces the prior art rubber bond, with consequent improvement with respect to strength and resistance to chemical attack. Secondly, the connector takes up little space, so that a multiplicity of side-by-side pairs of cable ends can be connected within the spatial confines of the belt. Thirdly, the connector has a degree of flexibility in it which allows it to pass around the conveyor drums without cutting into the rubber of the belt. And finally, the connector comprises means for drawing its associated cable ends together to a sufficient extent to enable the cables to be pulled to approximately the same tension.

While one specific embodiment of the invention has been shown in the Figures and described above, the scope of the invention is defined by the following claims.

The embodiments of the invention in which an exclusive property or privilege is claimed are defined as follows:

1. A connector for joining two cable ends in a conveyor belt comprising:
    a pair of sleeves, each sleeve forming a longitudinal bore extending therethrough, said bore having an inner section of reduced cross-sectional area relative to the remainder of the bore, said bore being of sufficient cross-sectional area so that each sleeve can slip onto one of the cable ends to be joined;
    a pair of wedge means, each adapted to be embedded in one cable end, once the sleeve has been slipped onto the cable end, to expand said cable end sufficiently so that the expanded end is small enough to enter the bore's outer section but is too large to pass through the bore's inner section, whereby each sleeve may be securely attached to one cable end; and
    bridging means for interconnecting the sleeves, said bridging means comprising
    rigid elongated first means extending between the sleeves,
    second means for connecting one end of the first means with one sleeve and enabling said first means to pivot relative to the longitudinal axis of said sleeve,
    and third means for connecting the other end of the first means with the other sleeve and enabling said first means to pivot relative to the longitudinal axis of said sleeve,
    whereby the bridging means is operative to hold the sleeves together in substantially aligned lineal relation while permitting the connector to flex, to a limited extent, when passing around a conveyor roll.

2. The connector as set forth in claim 1 comprising:
fourth means, associated with said second means, for moving the sleeve, attached to said second means, along the first means; and
fifth means, associated with said third means, for moving the sleeve, attached to said third means, along the first means;
whereby the sleeves may be drawn together as required to tension the cable ends.

3. A connector for joining two cable ends in a conveyor belt, comprising:
a pair of sleeves, each such sleeve forming a longitudinal bore extending therethrough, said bore having an internally threaded outer section and an inner section of reduced cross-sectional area relative to that of the outer section, the bore being of sufficient cross-sectional area so that each sleeve can slip onto one of the cable ends to be joined;
a pair of wedge means, each adapted to be embedded in one cable end, once the sleeve has been slipped onto the cable end, to expand said cable end sufficiently so that the expanded end is small enough to enter the bore's outer section but is too large to pass through the bore's inner section, whereby each sleeve may be securely attached to one cable end; and
bridging means for interconnecting the sleeves, said bridging means being operative to hold the sleeves together in substantially aligned lineal relation while permitting of limited tilting movement of each sleeve relative to the longitudinal axis of the connector, whereby said connector may flex, to a limited extent, when passing around a conveyor roll, said bridging means comprising
a shaft, having a removable enlarged head at each end, for extending into each of the bore outer sections,
a pair of externally threaded rings adapted to be mounted on the shaft between the heads and to thread into the outer sections of the sleeves, each said ring having a longitudinal bore extending therethrough which is sized to loosely accommodate the shaft but is sufficiently small so that the ring may not pass over the enlarged head, said rings being adapted to connect the sleeves with the shaft, to restrain the contained heads within the sleeves while permitting of some tilting of the shaft, and to be screwed inwardly or outwardly in the sleeves to adjust the spacing between the cable ends;
each shaft head and associated ring having rounded mating shoulders which permit of limited flexing of the connector.

4. The connector as set forth in claim 1, said pair of wedge means comprising:
a pair of externally threaded screws, each adapted to be screwed into one of the sleeves, before the shaft is inserted, to restrain the wedge member from displacement out of the cable end.

* * * * *